United States Patent [19]

Lehmann et al.

[11] Patent Number: 4,605,366

[45] Date of Patent: Aug. 12, 1986

[54] CALENDER FOR PRESSURE AND THERMAL TREATMENT OF MATERIAL WEBS

[75] Inventors: Rolf Lehmann, Rudolfstetten; Alfred Christ, Zürich, both of Switzerland

[73] Assignee: Sulzer-Escher Wyss AG, Zürich, Switzerland

[21] Appl. No.: 575,010

[22] Filed: Jan. 30, 1984

[30] Foreign Application Priority Data

Feb. 10, 1983 [CH] Switzerland .............. 750/83

[51] Int. Cl.⁴ .............................................. B29C 43/24
[52] U.S. Cl. ................................. 425/143; 100/93 RP;
264/175; 425/194; 425/363
[58] Field of Search ............. 264/175; 29/113 AD,
29/116 AD; 425/194, 79, 188, 151, 363, 384,
138, 446, 407, 223, 224, 362; 100/162 R, 93 RP;
72/200, 201

[56] References Cited

U.S. PATENT DOCUMENTS

| | | | |
|---|---|---|---|
| 1,022,617 | 4/1912 | Wintermeyer | 425/223 |
| 1,740,064 | 12/1929 | Boertlein | 425/223 |
| 1,745,891 | 2/1930 | Dimeo | 249/172 |
| 2,882,554 | 4/1959 | Heck | 264/175 |
| 3,042,968 | 7/1962 | Kraszeski | 425/223 |
| 3,871,290 | 3/1975 | Verboom | 100/155 R |
| 4,054,276 | 10/1977 | Wilson | 72/201 |
| 4,114,528 | 9/1978 | Walker | 100/47 |
| 4,140,894 | 2/1979 | Katakura et al. | 219/388 |
| 4,154,078 | 5/1979 | Lehmann | 72/201 |
| 4,222,324 | 9/1980 | Biondetti | 29/116 AD |
| 4,249,290 | 2/1981 | Lehmann | 29/116 AD |
| 4,262,511 | 4/1981 | Boisvert et al. | 72/201 |
| 4,272,976 | 6/1981 | Pizzedaz | 72/201 |
| 4,317,026 | 2/1982 | Koblo et al. | 219/388 |
| 4,372,736 | 2/1983 | Gooch et al. | 264/175 |

Primary Examiner—Jay H. Woo
Assistant Examiner—J. Fortenberry
Attorney, Agent, or Firm—Werner W. Kleeman

[57] ABSTRACT

At least one roll of the calender is heated and provided with heat insulating shields pivotably mounted on the sides of the calender and heat insulating end covers disposed at the ends of the rolls. A counter roll (controlled deflection roll) cooperates with the heated roll in the direction of its pressure or pressing action. The counter roll is provided with a cooling device (blower device) which is capable of being regulated in zones for cooling the surface of the counter roll.

11 Claims, 6 Drawing Figures

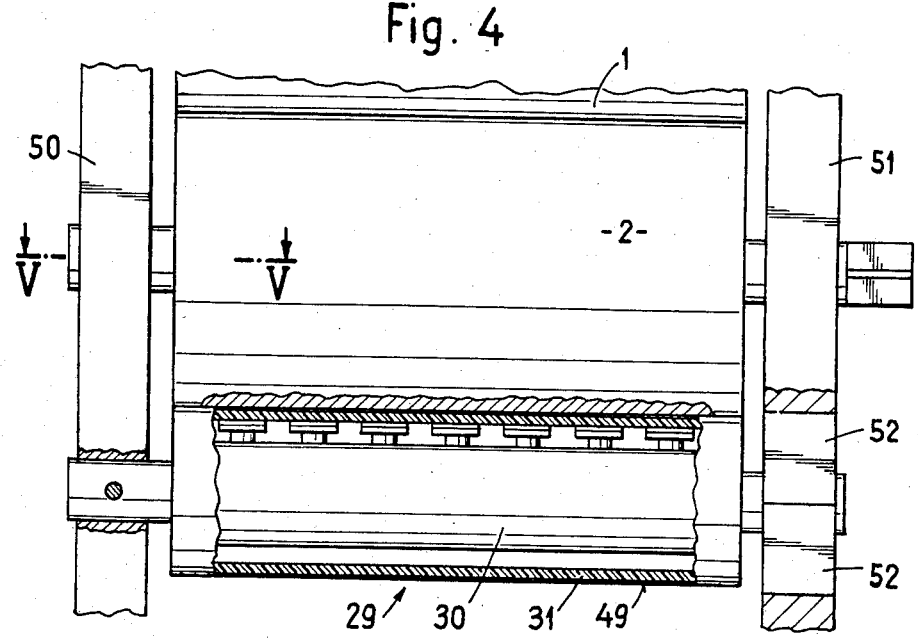
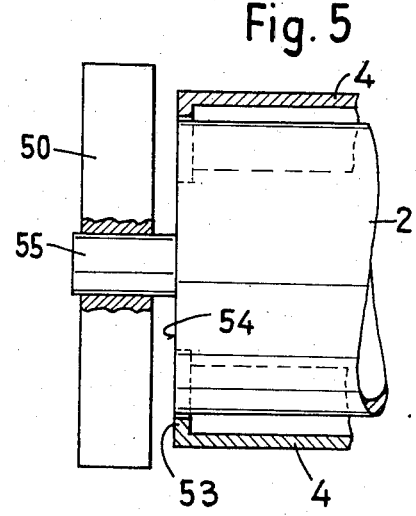
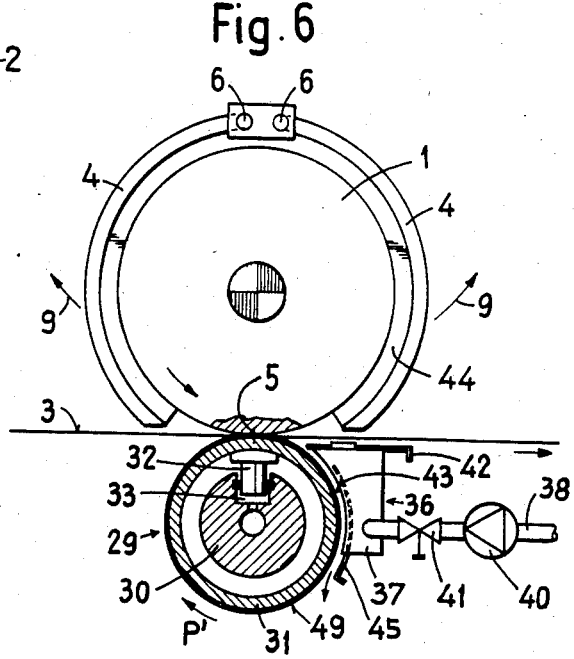

CALENDER FOR PRESSURE AND THERMAL TREATMENT OF MATERIAL WEBS

CROSS-REFERENCE TO RELATED APPLICATION

This application is related to the commonly assigned, copending U.S. application Ser. No. 06/575,009 filed Jan. 30, 1984, entitled "Two-Roll Calender With Heated Rolls".

BACKGROUND OF THE INVENTION

The present invention broadly relates to roll or calendering devices and, more specifically, pertains to a new and improved construction of a calender for pressure and thermal treatment of material webs.

Generally speaking, the present invention relates to a calender for the pressure and thermal treatment of sheets of plastic or of textile, or both, such as fiber webs, and having at least one heated roll and one counter roll cooperating therewith.

In known calenders or calendering devices of this type, the heated rolls are exposed to ambient air without heat insulation which leads to significant losses of energy. These heat losses generally have the advantage, as far as they are uniform, of tending to equalize the temperature profile of the rolls and therefore of providing a uniform quality of the sheet of material or web produced, especially in relation to its width. If these heat losses were prevented, the required uniformity of the temperature profile over the length of the roll would no longer be guaranteed.

SUMMARY OF THE INVENTION

Therefore, with the foregoing in mind it is a primary object of the present invention to provide a new and improved construction of a calender which does not have associated with it the aforementioned drawbacks and shortcomings of the prior art constructions.

Another and more specific object of the present invention aims at providing a new and improved construction of a calender of the previously mentioned type in which a substantial reduction in the heat energy supplied to the calender rolls is possible without affecting the required uniformity of the temperature profile over the length of the calender rolls, while the contact pressure acting in the contact pressure gap or nip of the calender can be locally influenced.

Yet a further significant object of the present invention aims at providing a new and improved construction of a calender of the character described which is relatively simple in construction and design, extremely economical to manufacture, highly reliable in operation, not readily subject to breakdown and malfunction and requires a minimum of maintenance and servicing.

Now in order to implement these and still further objects of the invention, which will become more readily apparent as the description proceeds, the calender of the present invention is manifested by the features that the heated roll is provided with heat insulating shields laterally pivotably mounted at the sides of the heated roll and heat insulating end covers arranged at the ends of the heated roll. Moreover, the counter roll is a controlled deflection roll having locally or zonewise regulatable contact pressure and comprises a cylindrical roll shell formed of highly elastic material of low thermal conductivity, for instance plastic, and is provided with a locally or zonewise adjustable cooling device for cooling its surface.

The heat insulating shields result in a significant saving in the heat energy required to heat the roll or rolls. The controlled deflection roll permits influencing the contact pressure acting between the cooperating rolls at the contact pressure gap or nip. The highly elastic roll shell permits local pressure action without a disturbing influence of the rigidity of the roll shell of the controlled deflection roll. The low thermal conductivity, i.e. the thermal insulative property of the material of the roll shell, prevents a migration of the heat from the heated roll cooperating with the roll shell into the interior of the controlled deflection roll, so that the inner system and especially its hydraulic medium remains relatively cool.

The cooling device is preferably a blower device for generating air currents or jets which are regulatable over the length of the roll. A very simple cooling device which is adequate for most cases is obtained by this measure.

The cooling device is preferably disposed at the exit or outbound side of the controlled deflection roll in the proximity of its contact pressure or pressing region. This measure permits extracting the heat from the roll shell immediately following the contact pressure or pressing zone between the controlled deflection roll and the heated roll before the heat can penetrate into a deeper layer of the roll shell.

The heat insulating shields are preferably pivotably mounted on the side of the heated roll opposite the contact pressure gap or nip. In this manner, an optimal accessibility of the heated roll is obtained when the heat insulating shields are pivoted away from the heated roll.

The heat insulating shields can be provided with an insulating layer as well as with a heat reflective foil facing the heated roll. This foil is preferably easily replaced.

The blower device can comprise a housing having nozzle apertures or openings arranged in at least one row which can be closed off individually or in groups by sliding dampers or baffles. It is to be understood that this blower device can also comprise a longitudinal slot extending over the entire length of the roll and whose width can be varied at different points according to requirements by any suitable means.

The housing of the blower device can be provided with further sliding dampers or baffles which extend into the gap between the housing and the roll shell of the controlled deflection roll at the side of the housing adjacent the heated roll. These sliding dampers or the like serve to regulate a current of cooling air in the gap between the heated roll and the associated heat insulating shield. In this manner the current of cooling air between the heated roll and the heat insulating shield can be additionally regulated, permitting local influence of the surface temperature of the heated roll.

The controlled deflection roll is preferably a roll of a type known per se having a roll shell which is movably guided in the contact pressure or pressing direction in relation to the roll support or beam. This permits an especially simplified construction of the calender since an external contact pressure or pressing mechanism in the framework of the calender can be omitted.

Additionally, the roll support of the controlled deflection roll in the framework of the calender can be constructed as a cantilever and provided with readily removable retaining frames or mounting elements at one of its ends, so that when the retaining frames or the like are removed a heat insulating jacket can be mounted on the roll shell of the controlled deflection roll. The heat insulating jacket can, for instance, be a fabrication of cotton. It additionally protects the roll shell from high temperatures.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 4 is a schematic partial section of the calender mounted in its supporting framework or roll stand taken substantially along the line IV—IV in FIG. 1;

FIG. 5 is a schematic partial section taken along the line V—V of FIG. 4; and

FIG. 6 is a schematic view and partial section of a further embodiment of the calender or calendering device according to the invention.

DETAILED DESCRIPTION OF THE PREFERRED EMBODIMENTS

Figure 1:
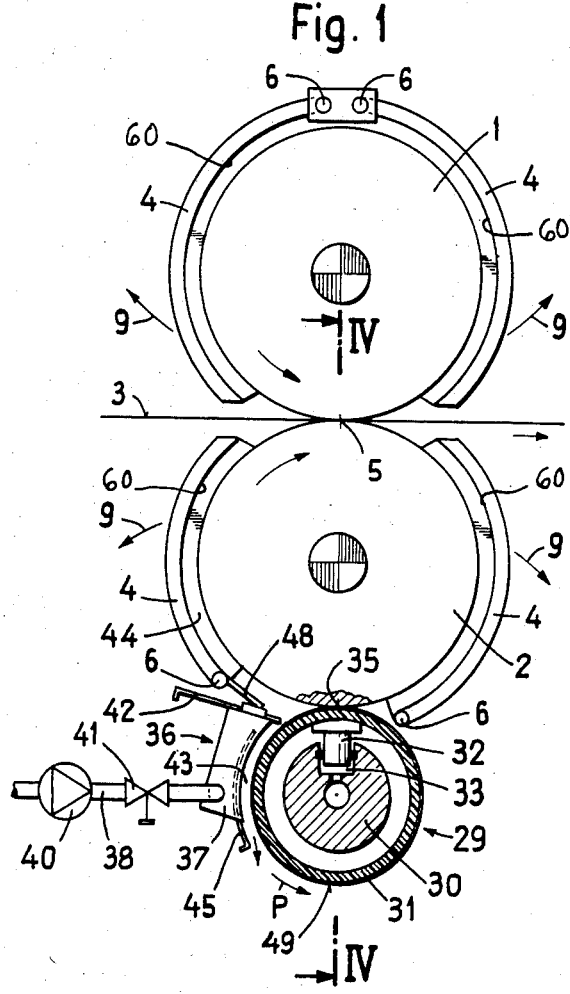
FIG. 1 is a schematic partial side view and partial section of a calender or calendering device according to the invention.

Describing now the drawings, it is to be understood that to simplify the showing of the drawings only enough of the structure of the calender or calendering device has been illustrated therein as is needed to enable one skilled in the art to readily understand the underlying principles and concepts of this invention. The illustrated exemplary embodiment of the calender will be seen to comprise an upper roll 1 and a lower roll 2 shown in FIG. 1. The framework or roll stand supporting these rolls 1 and 2 has been omitted in FIG. 1 for reasons of clarity. Both rolls 1 and 2 are provided with a conventional heating device known per se and which therefore is not shown in the drawings. By means of these heating devices, the rolls can be heated to a temperature of approximately 160° C.-250° C. In operation or service a sheet of material 3 of plastic or of textile, for instance a fiber web, to be subjected to pressure and thermal treatment is entrained between the calender rolls 1 and 2. Both of these rolls 1 and 2 are provided with heat insulating protective shields 4. The heat insulating protective shields 4 comprise an insulating layer as well as a heat reflective foil, e.g. an aluminum foil, facing the related roll, as generally indicated by reference character 60 in FIG. 1.

As can further be seen from FIG. 1, the heat insulating protective shields 4 are pivotably mounted in hinges 6 on the side of the rolls 1 and 2 located opposite the contact pressure gap or nip 5. This arrangement permits the heat insulating protective shields 4 to be pivoted out of the service or operating position in the direction of the arrows 9.

It can be seen in FIG. 1 that a controlled deflection roll 29 acts with a locally or zonewise regulatable contact pressure or pressing action upon the heated roll 2. The controlled deflection roll 29 has a substantially cylindrical roll shell or jacket 31 of highly elastic material and of low thermal conductivity, for instance plastic. The roll shell or jacket 31 of the controlled deflection roll 29 rotates about a stationary roll support or beam 30. Hydrostatic support or pressure pistons 32 are sealingly guided in support cylinders 33 of the roll support or beam 30. A suitable hydraulic pressure medium, typically oil, is supplied to the cylinders 33 through appropriate passages not particularly shown in the drawings. Rolls of this type, whose construction is not part of the present invention, are known from, for instance, U.S. Pat. No. 3,802,044, granted April 9, 1974, to which reference can be made for further details and the disclosure of which is incorporated herein by reference. The preferably employed controlled deflection roll having a roll shell movably guided in the pressure or pressing direction relative to the roll support is known from U.S. Pat. No. 3,885,283, granted May 27, 1975, from which further details may be taken, and the disclosure of which is incorporated herein by reference, .

To the left of the contact pressure zone or region 35 between the roll shell 31 and the lower heated roll 2, i.e. on the exit or outbound side of the roll shell 31 of the controlled deflection roll 29, there is arranged a cooling device in the form of a blower box or plenum chamber 36 mounted in proximity to the contact pressure zone 35. The blower box or plenum chamber 36 comprises a housing 37 which is connected to a fan or blower 40 by an air duct or conduit 38. There is a valve 41 in the air duct 38.

Figure 2:
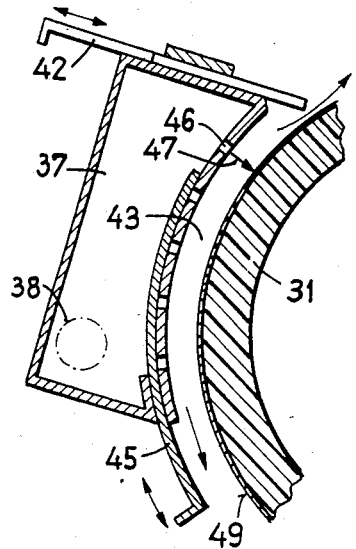
FIG. 2 is a schematic section through the housing of the blower device of FIG. 1 on an enlarged scale.
Figure 3:
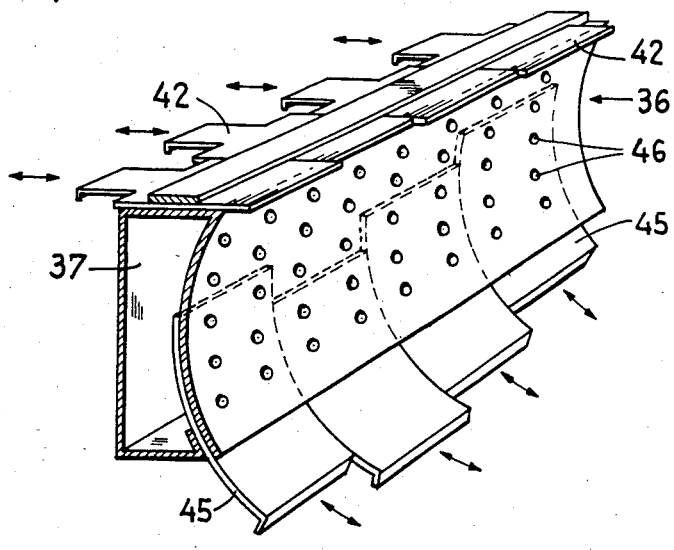
FIG. 3 is a schematic view of the blower device of FIGS. 1 and 2.

According to the illustration of FIGS. 2 and 3, the cooling device 36 comprises a housing 37 having a length relatively great in relation to its other dimensions. The cylindrically arched or domed side wall of the housing 37 facing the roll shell 31 is provided with nozzle apertures or openings 46 which, in the embodiment shown, are arranged in five rows. The nozzle apertures 46 are structured to generate air currents or jets 47 directed against the surface of the roll shell 31. The housing 37 is provided with sliding dampers or baffles 45 for opening and closing the nozzle apertures or openings 46. According to the position of the sliding dampers 45, the nozzle apertures 46 can be progressively or successively opened or closed.

The housing 37 of the cooling device 36 is further provided with sliding dampers or baffles 42 which extend into the gap or space 43 between the housing 37 and the roll shell 31 of the controlled deflection roll 29 at the end of the housing 37 adjacent the heated roll 2. These sliding dampers or baffles 42 serve to regulate a current of cooling air emitted from the nozzle apertures 46 into the gap or space 44 between the heated roll 2 and the corresponding heat insulating protective shield 4. In order to prevent penetration of ambient air into this gap or space 44, a deflection vane or sheet metal guide 48 is pivotably mounted on a hinge or pivot means 6 of the heat insulating protective shield 4 and sealingly contacts the housing 37 with its free end.

In the illustration of FIG. 4 the rolls 1, 2 and 29 are rotatably mounted in side members 50, 51 of a roll framework or stand which is not further illustrated in the drawings. The roll support or beam 30 of the controlled deflection roll 29 is rigidly fixed in cantilever or overhang fashion in the left-hand side member 50. The right end of the roll support 30 is supported by removable retaining frames or mounting elements 52 mounted in the side member 51. When these removable retaining frames or mounting elements 52 are removed, a thermally-insulating jacket or cover 49 can be pulled or drawn over the roll shell 31, for instance a seamless structural fabrication of cotton. The roll shell 31 can be freely rotating as shown in the drawings or can be driven by a suitable drive mechanism known per se and thus not shown in the drawings, at the same peripheral velocity as the roll 2.

FIG. 5 shows a closure detail of the heat insulating protective shields 4 at the ends of the roll. In the embodiment shown, lateral end seals or covers 53 are provided which extend to the surface of the associated roll 2. If there is sufficient space between the side member 50 and the end face 54 of the roll 2 then the end covers or seals 53 can extend up to the journals 55 of the corresponding rolls, i.e. in this case roll 2.

In service, the heated calender rolls 1 and 2 are pressed together and the contact pressure or pressing force in the contact pressure gap or nip 5 is modified by the regulation action of the controlled deflection roll 29. The rolls 1 and 2 are heated to a temperature of from 160° C. to 250° C. as is required for the pressure and thermal treatment of the relevant sheet of material or web 3. Due to the pressure action of the roll shell 31 in the contact pressure region 35 on the heated roll 2, the surface layer of the roll shell 2 is briefly heated up to the aforementioned temperatures. Since the roll shell 31 rotates in the direction of the arrow P, the heated surface immediately travels into the zone of influence of the air currents or jets 47 of the blower box 36. These air currents or jets thus cool the surface of the roll shell 31 before the heat can penetrate into lower layers of the roll shell or into the interior of the controlled deflection roll 29. This effect is augmented by the fact that the highly elastic material of the roll shell 31 also has a low thermal conductivity, i.e. acts as a thermal or heat insulator. This property prevents a deep penetration of the heat into the roll shell 31 in the short duration of time available.

When cooling air is introduced into the gap or space 44 by opening the sliding baffles 42 at selected positions, the surface temperature of the heated calender roll 2 can also be influenced. This permits a regulation of the uniformity of the surface temperature of such roll 2.

As can be seen from the modified embodiment of FIG. 6, one of the heated rolls, in this case the upper roll 1, also can cooperate with the unheated controlled deflection roll 29 to form a contact pressure gap or nip 5 through which the sheet of material or web 3 is guidably entrained. Corresponding to the direction of rotation P' of the controlled deflection roll 29, the blower box or plenum chamber 26 is here disposed to the right of the contact pressure gap or nip 5 in FIG. 6, thereby permitting a cooling of the downstream or outbound side of the roll shell 31 in this embodiment in the manner described above. The gap or space 43 can also be substantially closed in relation to the sheet of material or web 3 by the sliding baffles 42 or, according to the positions of the sliding baffles 42 be opened in zones to permit a regulated flow of cooling air counter to the direction of roll rotation P'. When processing permeable material, a portion of the cooling air can pass through the sheet of material 3 into the gap or space 44 between the downstream or outbound side of the roll 1 and the heat insulating protective shield 4.

While there are shown and described present preferred embodiments of the invention, it is to be distinctly understood that the invention is not limited thereto, but may be otherwise variously embodied and practiced within the scope of the following claims.

Accordingly, what we claim is:

1. A calender for the pressure and thermal treatment of sheet material of plastic or textile or both, comprising:
   at least one heated roll having two end faces and a circumferential region;
   at least one counter roll cooperating with said at least one heated roll at a contact pressure region;
   thermal insulating protective shields pivotally mounted at said circumferential region of said at least one heated roll to pivot away therefrom;
   thermal insulating end seals disposed in proximity to said end faces of said at least one heated roll;
   said at least one counter roll being a controlled deflection roll;
   said controlled deflection roll comprising:
      means for locally regulating a contact pressure force between the controlled deflection roll and said at least one heated roll; and
      a substantially cylindrical roll shell of highly elastic material and of low thermal conductivity;
   locally regulatable cooling means for cooling the surface of the controlled deflection roll; and
   said cooling means being disposed on an outbound side of said controlled deflection roll in the vicinity of said contact pressure region.

2. The calender as defined in claim 1, wherein:
said cooling means comprises a blower device generating an air current which is regulatable substantially over the length of the controlled deflection roll.

3. The calender as defined in claim 1, wherein:
said thermal insulating protective shields are pivotably mounted at said circumferential region of the at least one heated roll at a location opposite said contact pressure region.

4. The calender as defined in claim 1, wherein:
said thermal insulating protective shields each contain a layer of insulating material and a heat reflective foil arranged in facing relationship to said at least one heated roll.

5. The calender as defined in claim 2, wherein:
said blower device comprises:
   a housing having nozzle apertures arranged in at least one row and disposed in facing relationship to said controlled deflection roll;
   at least one sliding damper provided for said housing to regulate said nozzle apertures; and
   said nozzle apertures being closable individually or in groups by said at least one sliding damper.

6. The calender as defined in claim 5, wherein:
said housing of said blower device further comprises at least one sliding baffle disposed at a side of the housing adjacent said contact pressure region; and
said sliding baffle being capable of being slidably moved into a gap between said roll shell of the controlled deflection roll and the housing at the contact pressure region in order to regulate a flow of cooling air in a gap between the heated roll and an associated thermal insulating protective shield thereof.

7. The calender as defined in claim 1, wherein:
said controlled deflection roll comprises a roll support member; and said roll shell is movably guided in a direction of a contact pressure plane relative to said roll support member.

8. The calender as defined in claim 7, further including:
a supporting framework for said rolls;
said roll support member being mounted in a cantilever arrangement in said supporting framework;
at least one removably mounted retaining member provided for one end of said roll support member;
a heat insulating roll jacket; and
said roll support member of said controlled deflection roll being mounted at its ends in said supporting framework and said at least one removably mounted retaining member such that said heat insulating jacket is capable of being drawn over the controlled deflection roll when the end retaining member is removed.

9. The calender as defined in claim 1, wherein:
said roll shell is formed of a plastic material.

10. The calender as defined in claim 1, wherein:
said blower device includes a housing provided with at least one sliding baffle disposed at a side of the housing located adjacent said contact pressure region; and
said sliding baffle being capable of being slidably moved into a gap between said roll shell of the controlled deflection roll and the housing in the vicinity of the contact pressure region in order to regulate a flow of cooling air in a gap between said at least one heated roll and an associated thermal insulating protective shield thereof.

11. A roll device, comprising:
at least one heated roll having two end faces and a circumferential region;
at least one counter roll cooperating with said heated roll at a contact pressure region;
at least one thermal insulating protective shield pivotally mounted adjacent said circumferential region of said at least one heated roll to pivot away therefrom and form a gap in relation thereto;
at least one thermal insulating end seal disposed in proximity to a related end face of said at least one heated roll;
said counter roll being a controlled deflection roll;
said controlled deflection roll comprising:
means for regulating a contact pressure force between the controlled deflection roll and said at least one heated roll; and
a substantially cylindrical roll shell of highly elastic material and of low thermal conductivity;
cooling means cooperating with said controlled deflection roll; and
said cooling means being disposed on an outbound side of said controlled deflection roll in the vicinity of said contact pressure region.

* * * * *

UNITED STATES PATENT AND TRADEMARK OFFICE
CERTIFICATE OF CORRECTION

PATENT NO. : 4,605,366
DATED : August 12, 1986
INVENTOR(S) : ROLF LEHMANN et al

It is certified that error appears in the above—identified patent and that said Letters Patent is hereby corrected as shown below:

Column 7, line 21, (line 1 of claim 10), please change "1" to read --2--

Signed and Sealed this

Eighteenth Day of November, 1986

*Attest:*

DONALD J. QUIGG

*Attesting Officer*       *Commissioner of Patents and Trademarks*